United States Patent

Nakane et al.

[11] Patent Number: 6,103,420
[45] Date of Patent: Aug. 15, 2000

[54] CATHODE FOR LITHIUM SECONDARY BATTERY AND PRODUCTION METHOD FOR THE SAME

[75] Inventors: Kenji Nakane; Yasunori Nishida; Kenichiro Kami; Tomoari Satoh, all of Ibaraki-ken, Japan

[73] Assignee: Sumitomo Chemical Company, Limited, Osaka, Japan

[21] Appl. No.: 08/841,776

[22] Filed: May 5, 1997

Related U.S. Application Data

[63] Continuation of application No. 08/558,807, Nov. 15, 1995, abandoned.

[30] Foreign Application Priority Data

Nov. 22, 1994 [JP] Japan .................................. 6-287930

[51] Int. Cl.[7] .................................................. H01M 4/52
[52] U.S. Cl. ........................ 429/223; 423/594; 427/126.6
[58] Field of Search ........................ 429/223; 427/126.6, 427/247; 423/594

[56] References Cited

U.S. PATENT DOCUMENTS

| | | | |
|---|---|---|---|
| 5,370,948 | 12/1994 | Hasegawa et al. .................. | 423/594 X |
| 5,449,577 | 9/1995 | Dahn et al. ......................... | 423/594 X |
| 5,474,752 | 12/1995 | Yamamoto .......................... | 423/594 X |

FOREIGN PATENT DOCUMENTS

| | | |
|---|---|---|
| 0017400 | 10/1980 | European Pat. Off. . |
| 0345707 | 6/1989 | European Pat. Off. . |
| 0554649 | 11/1992 | European Pat. Off. . |
| 0573040 | 6/1993 | European Pat. Off. . |
| 0573040 | 12/1993 | European Pat. Off. . |
| 0643430 | 7/1994 | European Pat. Off. . |
| 0682377 | 5/1995 | European Pat. Off. . |
| 5-290851 | 11/1993 | Japan . |

Primary Examiner—Stephen Kalafut
Attorney, Agent, or Firm—Sughrue, Mion, Zinn, Macpeak & Seas, PLLC

[57] ABSTRACT

The invention provides a cathode for a lithium secondary battery including lithiated nickel dioxide with a large discharge capacity as an active material and having a high density so that a larger amount of the active material can be charged in a battery container with a limited volume, a production method for the same and a lithium secondary battery utilizing the cathode. The cathode for a lithium secondary battery includes lithiated nickel dioxide as an active material, and the lithiated nickel dioxide is produced by firing a mixture of a lithium compound and a nickel compound at a temperature ranging between 350° C. and 800° C. The supernatant obtained by dispersing 5 g of the lithiated nickel dioxide in 100 cm$^3$ of water in a glass vessel for 5 minutes and allowing the resultant solution to stand for 30 seconds has pH of 12.00 or less. The production method includes the steps of obtaining the lithiated nickel dioxide as above and treating or milling the lithiated nickel dioxide in an atmosphere including carbon dioxide.

11 Claims, 1 Drawing Sheet

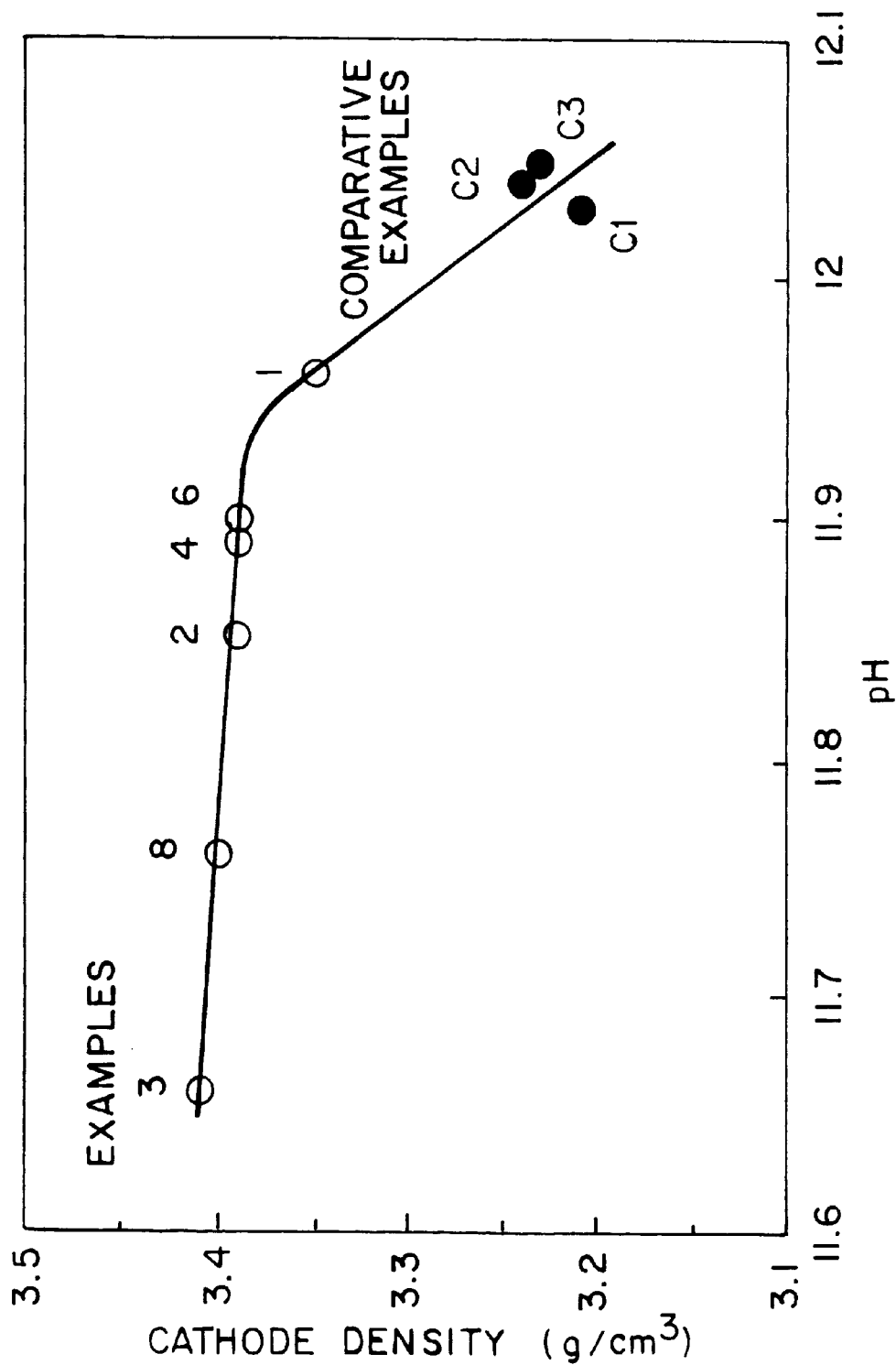

CATHODE FOR LITHIUM SECONDARY BATTERY AND PRODUCTION METHOD FOR THE SAME

This is a Continuation of Application Ser. No. 08/558,807 filed Nov. 15, 1995 now abandoned.

BACKGROUND OF THE INVENTION

1. Field of the Invention

The present invention relates to a cathode for a lithium secondary battery, and more particularly it relates to a sheet-type cathode and a production method for the same, and a lithium secondary battery utilizing the sheet-type cathode.

2. Description of Related Art

Lithiated cobalt dioxide and lithiated nickel dioxide are compounds having a so-called $\alpha$-NaFeO$^2$ type structure in which lithium ions are regularly arranged in a layered manner alternately with cobalt ions or nickel ions vertically to the closest packing layer of oxygen ions. Due to this structure, the lithium ions in a layer can be diffused comparatively easily. Lithium ions can be electrochemically doped or undoped in such a compounds Various studies have been made to apply these compounds to a cathode material in a lithium secondary battery that is expected to play an important role as a high-performance compact secondary battery, and in the futures as a power supply for an electric vehicle or a power storage device for load leveling.

Lithiated cobalt dioxide is already used as a material for a cathode in lithium secondary batteries that supply power to some portable telephones and video cameras. in consideration of material cost, however, lithiated cobalt dioxide, which is produced from an expensive cobalt compound, is inferior to lithiated nickel dioxide, which can be produced from an inexpensive and abundant nickel compound.

The charging/discharging characteristic of lithiated nickel dioxide, however, largely depends upon its synthesis method. It is difficult to synthesize lithiated nickel dioxide having a large discharge capacity compared to lithiated cobalt dioxide. The reason for this difficulty is that in lithiated nickel dioxide, nickel is easily substituted at a lithium site, and therefore, the resultant compound can contain substituted nickel at the lithium sites unless an appropriate synthesis condition is selected. Nickel at the lithium sites inhibits the diffusion of lithium ions, thereby adversely affecting the charging/discharging characteristic of the resultant lithiated nickel dioxide Recently, various attempts to synthesize lithiated nickel dioxide having a large discharge capacity have been made by optimizing the synthesis conditions. For example, Japanese Laid-Open Patent Publication No. 5-290851 discloses one of the methods for synthesizing lithiated nickel dioxide. In this method, lithium hydroxide and nickel hydroxide are mixed at a proportion of 1 mole of nickel hydroxide to 1.15 to 1.75 mole of lithium hydroxide, and the mixture obtained is heated at a temperature of 450 to 900° C. in air, thereby giving Li$^x$NiO$^y$ (wherein $1.15 \leq x \leq 1.75$ and $y > 0$). The publication describes that Li$^x$WiO$^y$ obtained by this method exhibits a large discharge capacity of 150 mAh/g or more.

European Laid-Open Patent Publication No. 573040 discloses another method for synthesizing lithiated nickel dioxide. In this method, 1 mole of at least one nickel compound selected from the group consisting of nickel carbonate, nickel nitrate, nickel hydroxide and nickel oxyhydroxide and more than 1 mole of at least one lithium compound selected from the group consisting of lithium nitrate, lithium carbonate and lithium hydroxide are mixed so as to achieve a composition of $1 < Li/Ni \leq 1.4$. The mixture obtained is fired to give lithiated nickel dioxide having a large discharge capacity.

A liquid or solid electrolyte is generally used in a lithium secondary battery, and such an electrolyte has a smaller conductivity than an aqueous type electrolyte used in a nickel-cadmium battery or a nickel-hydrogen battery. Therefore, in order to minimize the internal resistance and maximize an obtainable current value, cathodes and anodes are generally formed in the shape of a sheet, so as to increase the area of the electrodes. Such sheet-type electrodes are laminated or wound with a separator interposed therebetween in the production of a lithium secondary battery. Therefore, the production procedure includes a process to form a sheet-type electrode from an active material.

However, when powder including lithiated nickel dioxide having a large discharge capacity is used as an active material for a cathode, the density of the sheet-type cathode tends to be lowered in the cathode forming process where the active material, a conductive substance, a binder and a solvent are kneaded and the thus obtained paste is coated on a sheet-type current collector. Owing to the low density of the cathode, the amount of the active material to be charged in a battery container with a limited volume is decreased. As a result, the resultant lithium secondary battery cannot attain sufficient performance.

SUMMARY OF THE INVENTION

The present invention was devised to overcome the aforementioned problems. The objects of the invention are providing a cathode for a lithium secondary battery including lithiated nickel dioxide having a large discharge capacity as an active material for the cathode in which the cathode, in particular, in the shape of a sheet, has a high density and a large amount of the active material can be contained in a battery container with a limited volume; providing a production method for the cathode for a lithium secondary battery, and providing a lithium secondary battery utilizing the cathode and exhibiting an excellent charging/discharging characteristic.

As a result of earnest study and examination, the present inventors found that, when lithiated nickel dioxide is used as an active material for a cathode, the density of a sheet-type cathode can be increased by suppressing the pH value of a solution in which the powder of lithiated nickel dioxide is dispersed in water to be 12.00 or less in the process for obtaining paste of the active material, a conductive substance, a binder and a solvent. Thus, the present invention was accomplished.

The cathode for a lithium secondary battery of the invention comprises lithiated nickel dioxide as an active material, and the lithiated nickel dioxide is produced by firing a mixture of a lithium compound and a nickel compound at a temperature ranging between 350° C. and 800° C. A supernatant obtained by dispersing 5 g of the lithiated nickel dioxide in 100 cm$^3$ of water in a glass vessel for 5 minutes and allowing the resultant solution to stand for 30 seconds has pH of 12.00 or less.

The production method for the aforementioned cathode for a lithium secondary battery of the invention comprises the steps of firing a mixture of a lithium compound and a nickel compound at a temperature ranging between 350° C. and 800° C. to give lithiated nickel dioxide, and treating the lithiated nickel dioxide in an atmosphere including carbon dioxide:

Alternatively, the production method for the aforementioned cathode for a lithium secondary battery of the invention comprises the steps of firing a mixture of a lithium compound and a nickel compound at a temperature ranging between 350° C. and 800° C. to give lithiated nickel dioxide, and milling the lithiated nickel dioxide in an atmosphere including carbon dioxide.

In one aspect of the inventions the lithiated nickel dioxide is composite lithiated nickel dioxide including at least one metal selected from the group consisting of Ti, V, Cr, Mn, Fe, Co, Cu, Ag, Mg, Al, Ga, In and Sn in a proportion of 0.1 to 5 mole % on the basis of a sum of a molar number of the metal and a molar number of Ni contained in the lithiated nickel dioxide.

In another aspect of the invention, the production method for the cathode for a lithium secondary battery comprises the steps of producing composite lithiated nickel dioxide by mixing a lithium compound, a nickel compound and a compound at least one metal selected from the group consisting of Ti, V, Cr, Mn, Fe, Co, Cu, Ag, Mg, Al, Ga, In and Sn and firing the obtained mixture at a temperature ranging between 350° C. and 800° C.; and treating the composite lithiated nickel dioxide in an atmosphere including carbon dioxide.

In still another aspect, the production method for the cathode for a lithium secondary battery of the invention comprises the steps of producing composite lithiated nickel dioxide by mixing a lithium compound, a nickel compound and a compound at least one metal selected from the group consisting of Ti, V, Cr, Mn, Fe, Co, Cu, Ag, Mg, Al, Ga, In and Sn and firing the obtained mixture at a temperature ranging between 350° C. and 800° C.; and milling the composite lithiated nickel dioxide in an atmosphere including carbon dioxide.

The lithium secondary battery of the invention comprises a cathode including, as an active material, a material that can be doped/undoped with lithium ions; a negative electrode including, as an active material, a lithium metal, a lithium alloy or a material that can be doped/undoped with lithium ions; and a liquid or solid electrolyte. The cathode in the lithium secondary battery is any of the aforementioned cathodes for a lithium secondary battery.

Furthermore, the production method for a cathode for a lithium secondary battery of the invention comprises the steps of producing lithiated nickel dioxide or composite lithiated nickel dioxide including at least one metal selected from the group consisting of T, V, Cr. Mn, Fe, Co, Cu, Ag, Mg, Al, Ga, In and Sn in a proportion of 0.1 to 5 mole % on the basis of a sum of a molar number of the metal and a molar number of Ni contained in the lithiated nickel dioxide; kneading the lithiated nickel dioxide or the composite lithiated nickel dioxide together with a conductive substance, a binder and a solvent in an atmosphere including carbon dioxide to produce a paste; coating the paste over a current collector; and drying the current collector bearing the paste.

Other and further objects, features and advantages of the invention will appear more fully from the following description.

BRIEF DESCRIPTION OF THE DRAWING

FIG. 1 is a graph showing the relationship between the pH of a solution including lithiated nickel dioxide powder and the density of a cathode produced from the powder in each of Examples and Comparative Examples.

DETAILED DESCRIPTION OF THE INVENTION

The present invention will now be described in detail by way of examples.

A cathode for a lithium secondary battery according to the invention includes lithiated nickel dioxide as an active material. The lithiated nickel dioxide is obtained by mixing a lithium compound and a nickel compound and heating the resultant mixture at a temperature of 350 to 800° C. Five g of the thus obtained lithiated nickel dioxide is added to and dispersed in 100 cm$^3$ of water in a glass vessel for 5 minutes, then the resultant mixture is allowed to stand for 30 seconds to give a supernatant. It is noted that the supernatant has a pH value of 12.00 or less. At this point, the pH is measured through the procedure according to B method of JIS K5101 and the measurement according to JIS Z8002-7, whereas a type I pH meter and an electrode for room temperature are used.

The lithiated nickel dioxide serving as an active material is preferably composite lithiated nickel dioxide including at least one metal selected from the group consisting of Ti, V, Cr, Mn, Fe, Co, Cu, Ag, Mg, Al, Ga, In and Sn in a proportion of 0.1 to 5 mole % on the basis of the sum of the molar numbers of the metal and Ni in the lithiated nickel dioxide. Such composite lithiated nickel dioxide is preferable because the cycle characteristic of the resultant battery is improved when the battery is used at a high capacity.

The present cathode for a lithium secondary battery is preferably in the shape of a sheet because a sheet-type electrode can be industrially densified and handled with ease.

The present cathode for a lithium secondary battery comprises, in addition to the lithiated nickel dioxide as an active material, a carbonaceous material as a conductive substance, a thermoplastic resin as a binder, and the like.

Examples of the carbonaceous material include natural graphite, artificial graphite, cokes and carbon black. One of these materials can be used as a conductive substance, or a mixture of them, for example, a mixture of artificial graphite and carbon black, can be used as a composite conductive substance.

Various types of thermoplastic resins can be used as a binder in the present cathode. A fluororesin or fluororubber that is soluble in a solvent is preferably used because it can be homogeneously mixed with the other components with ease. Examples of the fluororesin include polyvinylidene fluoride (hereinafter referred to as PVDF), and ethylene tetrafluoride-propylene hexafluoride. vinylidene fluoride copolymers. Examples of the fluororubber include propylene hexafluoridevinylidern-fluoride copolymers and ethylene tetrafluorideperfluorovinyl ether copolymers. One or a combination of two or more of them can be used.

It is preferred that the conductive substance and the binder are mixed with the active material in the mixing ratios of 5 to 15 wt % and 1 to 10 wt%, respectively. When the contents of the conductive substance and the binder are smaller, a sufficient effect cannot be exhibited, and when the contents exceed the ranges, the capacity of the sheet-type cathode per weight becomes too small.

As a specific production method for the present cathode for a lithium secondary battery, the lithiated nickel dioxide or the composite lithiated nickel dioxide, the conductive substance, the binder and the solvent are mixed and kneaded to produce a paste, and the paste is coated over a current collector, which is then dried.

An example of the solvent includes 1-methyl-2-pyrrolidone (hereinafter referred to as NMP).

Examples of a material for the current collector used in the invention include Al, Ni and stainless steel, among which Al is preferred.

The lithiated nickel dioxide used in the invention is produced by firing a mixture of a lithium compound and a nickel compound.

The composite lithiated nickel dioxide used in the invention is produced by firing a mixture of a lithium compound, a nickel compound and a compound of at least one metal selected from the group consisting of Ti, V, Cr, Mn, Fe, Co, Cu, Ag, Mg, Al, Ga, In and Sn.

The lithium compound, the nickel compound and the compound of the metal can be carbonate, nitrate, oxide or hydroxide thereof.

The lithium compound and the nickel compound, or the lithium compound, the nickel compound and the metallic compound are mixed in a proportion that can attain an excessive content of lithium because excessive lithium results in a large discharge capacity.

The firing temperature is 350° C. or more and 800° C. or less, and preferably 600° C. or more and 750° C. or less in both the lithiated nickel dioxide and the composite lithiated nickel dioxide. When the firing temperature exceeds 800° C. the resultant lithiated nickel dioxide includes a large amount of a rock salt domain where lithium ions and nickel ions are irregularly arranged. This is not preferable because the rock salt domain inhibits reversible charge/discharge. When the firing temperature is lower than 350° C., a reaction for generating the lithiated nickel dioxide or the composite lithiated nickel dioxide is little proceeded.

The firing time is preferably 2 hours or more, and more preferably 5 hours or more.

The firing procedure is conducted preferably in the presence of oxygen, more preferably in oxygen, and most preferably in an oxygen stream.

The present production method for the cathode for a lithium secondary battery is characterized by utilizing lithiated nickel dioxide or composite lithiated nickel dioxide which is obtained by treating the lithiated nickel dioxide or the composite lithiated nickel dioxide produced as described above in an atmosphere including carbon dioxide.

A device used for-treating the lithiated nickel dioxide or the composite lithiated nickel dioxide is not herein specified but can be any heating device whose internal atmosphere can be substituted with an atmosphere including carbon dioxide. Examples of the device include a vacuum drier and a rotary evaporator. The treatment temperature and the treatment time are not specified, but the treatment temperature is preferably between room temperature and 200° C. because an ordinary vacuum drier can be operated in this temperature range.

Alternatively, the production method for the cathode for a lithium secondary battery is characterized by utilizing lithiated nickel dioxide or composite lithiated nickel dioxide obtained by milling the lithiated nickel dioxide or the composite lithiated nickel dioxide obtained as described above in an atmosphere including carbon dioxide.

This production method can be adopted at room temperature, and the milling time can be set as a time period sufficient for attaining a desired particle size. It is assumed that the interface in the reaction for decreasing the pH of the solution in which the powder of lithiated nickel dioxide is dispersed is updated by milling the lithiated nickel dioxide, so that the reaction time can be shortened. However, the detail of the mechanism is not clear yet.

A device used for milling the lithiated nickel dioxide or the composite lithiated nickel dioxide is not herein specified but can be any device whose atmosphere can be substituted with an atmosphere including carbon dioxides Examples of the device include a ball mill and a jet mill, The atmosphere including carbon dioxide herein means ordinary air or an atmosphere with a higher content of carbon dioxide than ordinary air, and is preferably an atmosphere including 20 volume % or more of carbon dioxide, and more preferably an atmosphere including 50 volume % or more of carbon dioxide. A commercially available carbon dioxide bomb is preferably used because it makes the procedure easy to conduct.

In the production method for a cathode for a lithium secondary battery of the invention, lithiated nickel dioxide or composite lithiated nickel dioxide, a conductive substance, a binder and a solvent are kneaded in an atmosphere including carbon dioxide to give paste, and the paste is coated over a current collector, which is then dried.

The conductive substance used in the invention can be a carbonaceous material such as natural graphite, artificial graphite cokes and carbon black. One of these materials can be used as a conductive substance, or a mixture of them, for example, a mixture of artificial graphite and carbon black, can be used as a composite conductive substance.

The binder used in the present production method can be a thermoplastic resin. A preferable thermoplastic resin is a fluororesin or fluororubber soluble in a solvent because it can be homogeneously mixed with other components with ease. Examples of the fluororesin include PVDW and ethylene tetrafluoride.propylene hexafluoride.vinylidone fluoride copolymers. Examples of the fluororubber include propylene hexafluoridevinyliden fluoride copolymers and ethylene tetrafluorideperfluorovinyl ether copolymers. One or a combination of two or more of them can be used as the binder.

An example of the solvent used in the present production method includes NMP.

Examples of a material for the current collector used in the present method include Al, Ni and stainless steel, among which Al is preferred.

In the present method, it is preferable that the conductive substance and the binder are mixed with the active material in the mixing ratios of 5 to 15 wt % and 1 to 10 wt %, respectively. When the contents of the conductive substance and the binder are smaller, a sufficient effect cannot be exhibited, and when the contents exceed the ranges, the capacity of the sheet-type electrode per weight becomes too small.

A device used in producing a paste of an active material, a conductive substance, a binder and a solvent in not herein specified but can be any device whose internal atmosphere can be substituted with an atmosphere including carbon dioxide. Examples of the device include a ball mill and a bead mill.

A sheet-type cathode produced by coating the paste of an active material, a conductive substance, a binder and a solvent according to the invention can attain a high density. The reason has not been clearly understood but is regarded to have some relation to carbon dioxide suppressing the increase of viscosity of the paste.

The lithium secondary battery of the invention comprises a cathode including, as an active material, a material that can be doped/undoped with lithium ions, a negative electrode including, as an active material, a lithium metal, a lithium alloy or a material that can be doped/undoped with lithium ions, and a liquid or solid electrolyte, and the cathode is the aforementioned cathode for a lithium secondary battery.

The anode of the present lithium secondary battery includes a lithium metal, a lithium alloy or a material that can be doped/undoped with lithium ions. Examples of the material that can be doped/undoped with lithium ions include carbonaceous materials such as natural graphite, artificial graphite, cokes, carbon black, pyrolytic carbons, carbon fibers and fired products of organic polymer compounds. A carbonaceous material including a graphite material such as natural graphite and artificial graphite as a main component is preferred because the combination of such a carbonaceous material and a cathode provides a high energy density due to its high flatness of charging/discharging potential and low average working potential.

When the graphite material is used, it is preferred that the graphite material is treated with a silane coupling agent and/or the graphite material is mixed with pseudo-graphitic carbon black. Thus, the irreversible capacity during the initial charge/discharge of the resultant battery can be minimized to improve the efficiency of using lithium.

Examples of the silane coupling agent include vinyltriethoxysilane, vinyltrimethoxysilane, vinyltris(2-methoxyethoxy)silane, γ-methacryloxypropyltrimethoxysilane, γ-aminopropyltriethoxysilane, N-β-(aminoethyl)-γ-aminopropyltrimethoxysilane, γ-ureidopropyltriethoxysilane, β-(3,4-epoxycyclohexyl)ethyltrimethoxysilane, and γ-glycidoxypropyltrimethoxysilane. The amount of the silane coupling agent used for treating the graphite material is preferably 0.01 to 20 parts by weight per 100 parts by weight of the graphite material, more preferably 0.1 to 10 parts by weight, and most preferably 0.5 to 5 parts by weight.

The pseudo-graphitic carbon black preferably has a lattice interval $d_{002}$ obtained by X-ray diffraction of 3.38 to 3.46Å, has a true specific gravity of 1.9 to 2.1, includes 0.5 wt % or less of a volatile component, has a number-average particle size of 10 to 100 nm, and has a specific surface area obtained by nitrogen adsorption of 10 to 300 m$^2$/g. Such pseudo-graphitic carbon black is obtained by heating carbon black, such as furnace black made from creosote oil, ethylene bottom oil, and natural gas, and acetylene black made from acetylene, at a high temperature of approximately 2500 to 2800° C.

The graphite material and the pseudo-graphitic carbon black are mixed preferably in proportions of 70 to 99 wt % of the graphite material and 30 to 1 wt % of the pseudo-graphitic carbon black, and more preferably 80 to 97 wt % of the graphite material and 20 to 3 wt % of the pseudo-graphitic carbon black, and most preferably 90 to 96 wt % of the graphite material and 10 to 4 wt % of the pseudo-graphitic carbon black.

When ethylene carbonate is not used as an electrolyte, the anode preferably includes poly(ethylene carbonate), which can improve the cycle characteristic and the large-current charging/discharging characteristic of the resultant secondary battery.

The carbonaceous material can be in any shape including a flake, a sphere, a fiber and an agglomerate of fine powder, and can include a thermoplastic resin as a binder, if necessary. Examples of the thermoplastic resin include PVDF, polyethylene, and polypropylene.

The electrolyte of the present lithium secondary battery can be any of known nonaqueous liquid electrolytes solutions in which a lithium salt is dissolved in an organic solvent, and solid electrolytes. Examples of the lithium salt include $LiClO_4$, $LiPF_6$, $LiAsF_6$, $LiSbF_6$, $LiBF_4$, $LiCF_3SO_3$, $LiC(CF_3SO_2)_3$, $LiN(CF_2SO_2)_2$, $Li_2B_{10}Cl_{10}$, lower aliphatic lithium carboxylate and $LiAlCl_4$. One or a combination of two or more of them can be used.

Examples of the organic solvent include carbonates such as propylene carbonate, ethylene carbonate, dimethyl carbonate, diethyl carbonate, ethylmethyl carbonate, 4-trifluoromethyl-1,3-dioxolan-2-one, and 1,2-di(methoxycarbonyloxy)ethane; ethers such as 1,2-dimethoxyethane, 1,3-dimethoxypropane, pentafluoropropylmethylether, tetrahydrofuran, and 2-methyltetrahydrofuran; esters such as methyl formate, methyl acetate and γ-butyrolactone; nitriles such at acetonitrile and butyronitrile; amides such as N,N-dimethylformamide, and N,N-dimethylacetoamide; carbamates such as 3-methyl-2-oxazolidone; and sulfur-containing compounds such as sulfolane, dimethylsulfoxide and 1,3-propane sultone. Generally, a mixture of two or more of them is used. In particular, a mixed solvent including a carbonate is preferably used, and a mixed solvent of a combination of a cyclic carbonate and an noncyclic carbonate or a combination of a cyclic carbonate and an ether is more preferably used. As the mixed solvent of a cyclic carbonate and an noncyclic carbonate, a mixed solvent including ethylene carbonate, diethyl carbonate and ethylmethyl carbonate is preferred because such a mixed solvent has a wide range of an operation temperature and an excellent drain capability, and is little decomposed even when the graphite material such as natural graphite and artificial graphite is used as an active material for the anode.

Examples of the solid electrolyte include polymer electrolytes such as polyethylene oxide polymer compounds and polymer compounds including at least one of a polyorganosiloxane branch and a polyoxyalkylene branch; sulfide type electrolytes such as $Li_2S\text{-}SiS_2$, $Li_2S\text{-}GeS_2$, $Li_2S\text{-}P_2S_5$, and $Li_2S\text{-}B_2S_3$; and inorganic compound type electrolytes including sulfide such as $Li_2S\text{-}SiS_2\text{-}Li_3PO_4$ and $Li_2S\text{-}SiS_2\text{-}Li_2SO_4$. Furthermore, a so-called gel type electrolyte in which a nonaqueous liquid electrolyte is held by a polymer can be used.

The shape of the present lithium secondary battery is not particularly specified, and can be in any shape including paper, a coin, a cylinder and a rectangular parallelepiped.

The present invention will now be described in more detail by way of examples, and it is noted that the invention is not limited by these examples. An electrode and a plate battery for a charging/discharging test were manufactured as follows, unless otherwise mentioned.

First, 88 wt % of powder of lithiated nickel dioxide as an active material, 6 wt % of acetylene black (brand nam: Denka Black; 50% pressed product manufactured by Denki Kagaku Yogyo K. K.) as a conductive substance, and 6 wt % of a fluororesin (brand name: Teflon 30-J; manufactured by Du pont-Mitsui Fluorochemicals Co., Ltd.) as a binder were kneaded with water to give paste. The paste was coated over a #200 stainless steel mesh used as a current collector, and the resultant collector was dried in vacuum at a temperature of 150° C. for 8 hours. Thus, a cathode was produced.

A plate battery was manufactured from the thus produced cathode. As a liquid electrolyte, lithium perchlorate was dissolved in a proportion of 1 moleliter in a 1:1 mixture of propylene carbonate (hereinafter referred to as PC) and. 1,2-dimethoxyethane (hereinafter referred to as DME). A polypropylene microporous membrane was used as a separator, and metal lithium was used as a counter electrode (anode).

The pH measurement was performed in accordance with JIS K5101 B method. Specifically, 5 g of the lithiated nickel dioxide was dispersed in 100 cm$^3$ of water in a glass vessel for 5 minutes, and the resultant solution was allowed to stand for 30 seconds. The supernatant of the solution was measured for pH in accordance with JIS Z8802-7. The used pH meter was a glass electrode type hydrogen ion concentration meter HM-40V (manufactured by Toa Electronics Ltd.), and the measurement temperature was 27° C.

COMPARATIVE EXAMPLE 1

First, 144.8 g of lithium nitrate (manufactured by Wako Pure Chemical Industries, Ltd.; reagent guaranteed grade) was dissolved in 100 g of water. To the resultant solution was added 267.4 g of basic nickel carbonate ($NiCO_3 \cdot 2Ni(OH)_2 \cdot 4H_2O$ with the Ni content of 43.9 wt%; manufactured by Wako Pure Chemical Industries, Ltd.; reagent grade; average particle size: 20 μm) to be homogeneously dispersed. The water content of the obtained solution was evaporated with a rotary evaporator, and the resultant was charged in a tublar furnace using a mullite core tube to be fired in an oxygen stream of 750 cm$^3$/min. at a temperature of 720° C. for 6 hours, thereby giving lithiated nickel dioxide powder. The powder was found to have an α-$NaFeO_2$ type structure by powder X-ray diffraction.

The solution in which the powder was dispersed in water had a pH value of 12.03.

The obtained powder was used to produce a plate battery, which was subjected to a charging/discharging test under the condition of a maximum charging voltage of 4.2 V, a minimum discharging voltage of 2.5 V, and a constant current of 0.17 mA,/cm$^2$. The discharge capacity in the third cycle of the test was 169 mAh/g, and the battery exhibited an excellent cycle characteristic.

Next, a cylindrical battery was manufactured. A mixture of the lithiated nickel dioxide powder as an active material and artificial graphite powder (brand name: XS-15; manufactured by Lonza) as a conductive substance was mixed with a NMP solution including PVDF as a binder, so as to achieve a weight ratio among the active material, the conductive substance and the binder of 87:10:3. The obtained mixture was charged in a polyethylene pot, where the mixture was kneaded in the air with a ball mill using a 15 mmø nylon coated steel ball, so as to give paste. At this point, the concentration of the NMP solution including PVDF was PVDF:NMP=3:45 in the weight ratio. The paste was coated over an aluminum foil with a doctor blade, and the resultant foil was dried in vacuum and subjected to roll press. Thus, a sheet-type cathode was produced. The density of the sheet-type cathode was 3.21 g/cm$^3$.

EXAMPLE 1

The powder of lithiated nickel dioxide obtained in Comparative Example 1 was charged in a rotary evaporator, where the powder was treated at room temperature for 3 hours in a highly purified carbon dioxide stream supplied from a carbon dioxide gas bomb at a rate of 5 cm$^3$/min. The pH of a solution in which the treated powder was dispersed in water was found to be 11.96.

A plate battery was manufactured by using the treated powder, and the battery was subjected to a charging/ discharging test under the same condition as in Comparative Example 1. The discharge capacity in the third cycle was 174 mAh/g, and the battery exhibited an excellent cycle characteristic.

Next, a sheet-type cathode was produced in the same manner as in Comparative Example 1 to manufacture a cylindrical battery. The density of the sheet-type cathode was 3.35 g/cm$^3$.

EXAMPLE 2

The powder of lithiated nickel dioxide obtained in Comparative Example 1 was charged in a vacuum drier to be degassed in vacuum. Then, the internal atmosphere of the drier was substituted with highly purified carbon dioxide supplied from a carbon dioxide gas bomb, and the powder was allowed to stand in the drier for 3 hours at a temperature of 180° C. The pH of a solution in which the treated powder was dispersed in water was 11.85.

A plate battery was manufactured by using the powder, and was subjected to a charging/discharging test under the same condition as in Comparative Example 1. The discharge capacity in the third cycle was 171 mAh/g, and the battery exhibited an excellent cycle characteristic.

A sheet-type cathode was produced in the same manner as in Comparative Example 1 to manufacture a cylindrical battery. The density of the sheet-type cathode was 3.39 g/cm$^3$.

EXAMPLE 3

The powder of lithiated nickel dioxide obtained in Comparative Example 1 was charged in a vacuum drier to be degassed in vacuum. Then, the internal atmosphere of the drier was substituted with highly purified carbon dioxide supplied from a carbon dioxide gas bomb, and the powder was allowed to stand in the drier for 3 hours at a temperature of 200° C. The pH of a solution in which the treated powder was dispersed in water was 11.66.

A plate battery was produced by using the powder and was subjected to a charging/discharging test under the same condition as in Comparative Example 1. The discharge capacity in the third cycle was 172 mAh/g, and the battery exhibited an excellent cycle characteristic.

Next, a sheet-type cathode was produced in the same manner as in Comparative Example 1 to manufacture a cylindrical battery. The density of the sheet-type cathode was 3.41 g/cm$^3$.

EXAMPLE 4

The mixture including lithiated nickel dioxide was fired in the same manner as in Comparative Example 1, and then, the fired substance was charged in an alumina ball mill. The internal atmosphere of the alumina ball mill was substituted with highly purified carbon dioxide supplied from a carbon dioxide gas bomb. Then, the fired substance was milled with the alumina ball mill to give powder of lithiated nickel dioxide. The powder was found to have an α-$NaFeO_2$ type structure by X-ray diffraction. The pH of a solution in which the powder was dispersed in water was 11.89.

A plate battery was manufactured by using the powder and was subjected to a charging/discharging test under the same condition as in Comparative Example 1. The discharge capacity in the third cycle was 170 mAh/g, and the battery exhibited an excellent cycle characteristic.

Next, a sheet-type cathode was produced in the same manner as in Comparative Example 1 to manufacture a cylindrical battery. The density of the sheet-type cathode was 3.39 g/cm$^3$.

EXAMPLE 5

A sheet-type cathode was produced by using the powder of lithiated nickel dioxide obtained in Comparative Example 1 in the same manner as in Comparative Example 1 except that the materials for the sheet-type cathode were kneaded in an atmosphere including highly purified carbon dioxide. The density of the sheet-type electrode was 3.40 g/cm$^3$.

EXAMPLE 6

The mixture including lithiated nickel dioxide was fired in the same manner as in Comparative Example 1, and the obtained fired substance was charged in an alumina ball mill. Highly purified carbon dioxide was supplied from a carbon dioxide gas bomb to the alumina ball mill so as to achieve a concentration of carbon dioxide of approximately 50%. The fired substance was milled with the alumina ball mill to give powder of lithiated nickel dioxide. The powder was found to have an α-NaFeO$_2$ type structure by X-ray diffraction. The pH of a solution in which the powder was dispersed in water was 11.90.

A plate battery was manufactured by using the powder, and was subjected to a charging/discharging test under the same condition as in Comparative Example 1. The discharge capacity in the third cycle was 171 mAh/g, and the battery exhibited an excellent cycle characteristic.

Next, a sheet-type cathode was produced in the same manner as in Comparative Example 1 to manufacture a cylindrical battery. The density of the sheet-type cathode was 3.39 g/cm$^3$.

COMPARATIVE EXAMPLE 2

First, 11.02 g of gallium nitrate (Ga(NO$_3$)$_3$·6.2H$_2$O; manufactured by Chemical Laboratory Co., Ltd.; reagent 3N grade) was dissolved in 150 g of water. In the obtained solution was dissolved 4.53 g of lithium hydroxide monohydrate (LiO·H$_2$O; manufactured by Wako Pure Chemical Industries, Ltd.; reagent guaranteed grade). The resultant solution once became cloudy, and then became substantially transparent. To the resultant solution were further added 101.2 g of lithium nitrate (manufactured by Wako Pure Chemical Industries, Ltd; reagent guaranteed grade) and 196.6 g of basic nickel carbonate (NiCO$_3$·2Ni(OH)$_2$·4H$_2$O with the Ni content of 43.9 wt %; manufactured by Wako Pure Chemical Industries, Ltd.; reagent grade; average particle size; 20 μm) to be homogeneously dispersed. The water content of the thus obtained solution was evaporated by using a rotary evaporator, and the resultant was charged in a tublar furnace using a mullite core tube to be fired in an oxygen stream of 750 cm$^3$/min. at a temperature of 660° C. for 15 hours. At this point, the molar ratio of gallium to the sum of gallium and nickel was 0.02.

A plate battery was manufactured by using the obtained powder. A liquid electrolyte to be used was obtained by dissolving LiPF$_6$ in a proportion of 1 mole/litter in a 30:35:35 mixture of ethylene carbonate (hereinafter refereed to as EC), dimethyl carbonate (hereinafter refereed to as DMC) and ethylmethyl carbonate (hereinafter referred to as EMC) (which liquid electrolyte is hereinafter referred to as LiPF$_6$/EC+DMC+BMC). The battery was subjected to a charging/discharging test under the condition of a maximum charging voltage of 4.3 V, a charging time of a 8 hours, a charging current of 0.3 mA/cm$^2$, a minimum discharging voltage of 3.0 V, and a discharging current of 0.3 mA/cm$^2$.

Owing to the addition of gallium, the battery exhibited an improved cycle characteristic when used at a high capacity. The discharge capacity in the 11th cycle was 183 mAh/g, and a capacity holding ratio between the 11th and the 20th cycles (i.e., the discharge capacity in the 20th cycle/the discharge capacity in the 11th cycle) was 1.005.

The pH of a solution in which the powder was dispersed in water was 12.04.

Next, a sheet-type cathode was produced in the same manner as in comparative Example 1 to manufacture a cylindrical battery. The density of the sheet-type cathode was 3.24 g/cm$^3$.

EXAMPLE 7

A sheet-type cathode was produced by using the powder of lithiated nickel dioxide including gallium obtained in Comparative Example 2 in the same manner as in Comparative Example 1 except that the materials for the sheet-type cathode were kneaded in an atmosphere including highly purified carbon dioxide. The density of the sheet-type cathode was 3.38 g/cm$^3$. Thus, the present invention is applicable to lithiated nickel dioxide including an additive for improving its property (corresponding to gallium in this example).

COMPARATIVE EXAMPLE 3

First, 12.07 g of lithium nitrate (manufactured by Wako Pure Chemical Industries, Ltd.; reagent guaranteed grade) was dissolved in 16.7 g of water. To the resultant solution were added 0.56 g of metastannic acid (H$_2$SnO$_3$; manufactured by Nihon Kagaku Sangyo Co., Ltd.; purity: 95%) and 21.84 g of basic nickel carbonate (NiCO$_3$·2Ni(OH)$_2$·4H$_2$O with the Ni content of 43.9 wt %; manufactured by Wako Pure Chemical Industries, Ltd.; reagent grade; average particle size: 20 μm) to be homogeneously dispersed. The water content of the thus obtained solution was evaporated by using a rotary evaporator, and the resultant was charged in a tublar furnace using an alumina core tube to be fired in an oxygen stream of 50 cm$^3$/min. at a temperature of 660° C. for 15 hours. At this point, the molar ratio of tin to the sum of tin and nickel was 0.02.

The thus obtained powder was used to manufacture a plate battery (in which the liquid electrolyte was LiPF$_6$/EC+DMC+EMC), and the battery was subjected to a charging/discharging test under the same condition as in Comparative Example 2. The battery exhibited an improved cycle characteristic owing to the addition of tin. The discharge capacity in the 11th cycle was 191 mAh/g, and the capacity holding ratio between the 11th and the 20th cycles (i.e., the discharge capacity in the 20th cycle/the discharge capacity in the 11th cycle) was 0.984.

The pH of a solution in which the powder was dispersed in water was 12.05.

Next, a sheet-type cathode was produced in the same manner as in Comparative Example 1 to manufacture a cylindrical battery. The density of the sheet-type cathode was 3.23 gcm$^3$.

EXAMPLE 8

The powder of lithiated nickel dioxide including tin obtained in Comparative Example 3 was charged in a vacuum drier to be degassed in vacuum. Then, the internal atmosphere of the drier was substituted with highly purified carbon dioxide supplied from a carbon dioxide gas bomb, and the powder was allowed to stand in the drier at a temperature of 180° C. for 3 hours. The thus treated powder was dispersed in water and the pH was found to be 11.76. Then, a sheet-type cathode was produced in the same manner as in Comparative Example 1 to manufacture a cylindrical battery. The density of the sheet-type cathode was 3.40 g/cm$^3$. Thus, the present invention is applicable to lithiated nickel dioxide including an additive for improving its property (corresponding to tin in this example).

The relationship between the pH of the solution in which the powder was dispersed in water and the density of the cathode produced from the powder in each of Examples 1, 2, 3, 4, 6 and 8 and Comparative Examples 1, 2 and 3 is shown in FIG. 1.

As is apparent from the results of the examples and FIG. 1, the present sheet-type cathode for a lithium secondary battery has a large density, thereby increasing the amount of an active material to be charged in a battery container with a limited volume. Accordingly, the resultant lithium secondary battery using the sheet-type cathode can exhibit an excellent charging/discharging characteristic, which is significantly valuable in the industry.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds are therefore intended to embraced by the claims.

What is claimed is:

1. A cathode for a lithium secondary battery comprising lithiated nickel dioxide as an active material, the lithiated nickel dioxide being produced by firing a mixture of a lithium compound and a nickel compound at a temperature ranging between 350° C. and 800° C., followed by treating the lithiated nickel dioxide in an atmosphere including carbon dioxide, wherein a supernatant obtained by dispersing 5 g of the lithiated nickel dioxide in 100 cm$^3$ of water in a glass vessel for 5 minutes and allowing the resultant solution to stand for 30 seconds has a pH of 12.00 or less.

2. A lithium secondary battery comprising:
   a cathode including, as an active material, a material that can be doped/undoped with lithium ions;
   an anode including, as an active material, a lithium metal, a lithium alloy or a material that can be doped/undoped with lithium ions; and
   a liquid or a solid electrolyte,
   wherein the cathode is the cathode for a lithium secondary battery of claim 1.

3. The cathode for a lithium secondary battery according to claim 1,
   wherein the lithiated nickel dioxide is composite lithiated nickel dioxide including at least one metal selected from the group consisting of Ti, V, Cr, Mn, Fe, Co, Cu, Ag, Mg, Al, Ga, In and Sn in a proportion of 0.1 to 5 mole % on the basis of a sum of a molar number of the metal and a molar number of Ni contained in the lithiated nickel dioxide.

4. A lithium secondary battery comprising:
   a cathode including, as an active material, a material that can be doped/undoped with lithium ions;
   an anode including, as an active material, a lithium metal, a lithium alloy or a material that can be doped/undoped with lithium ions; and
   a liquid or solid electrolyte,
   wherein the cathode is the cathode for a lithium secondary battery of claim 3.

5. A production method for a cathode for a lithium secondary battery, comprising the steps of:
   (a) firing a mixture of a lithium compound and a nickel compound at a temperature ranging between 350° C. and 800° C. to give lithiated nickel dioxide, and
   (b) treating the lithiated nickel dioxide in an atmosphere including carbon dioxide which content is higher than air.

6. A production method for a cathode for a lithium secondary battery, comprising the steps of:
   (a) firing a mixture of a lithium compound and a nickel compound at a temperature ranging between 350° C. and 800° C. to give lithiated nickel dioxide, and
   (b) milling the lithiated nickel dioxide in an atmosphere including carbon dioxide which content is higher than air.

7. A production method for a cathode for a lithium secondary battery, comprising the steps of:
   (a) producing composite lithiated nickel dioxide by mixing a lithium compound, a nickel compound and a compound of at least one metal selected from the group consisting of Ti, V, Cr, Mn, Fe, Co, Cu, Ag, Mg, Al, Ga, In and Sn and firing the obtained mixture at a temperature ranging between 350° C. and 800° C.; and
   (b) treating the composite lithiated nickel dioxide in an atmosphere including carbon dioxide which content is hither than air.

8. A production method for a cathode for a lithium secondary battery, comprising the steps of
   (a) producing composite lithiated nickel dioxide by mixing a lithium compound, a nickel compound and a compound of at least one metal selected from the group consisting of Ti, V, Cr, Mn, Fe, Co, Cu, Ag, Mg, Al, In and Sn and firing the obtained mixture at a temperature ranging between 350° C. and 800° C.; and
   (b) milling the composite lithiated nickel dioxide in an atmosphere including carbon dioxide which content is higher than air.

9. A production method for a cathode for a lithium secondary battery, comprising the steps of producing lithiated nickel dioxide or composite lithiated nickel dioxide including at least one metal selected from the group consisting of Ti, V, Cr, Mn, Fe, Co, Cu, Ag, Mg, Al, Ga, In and Sn in a proportion of 0.1 to 5 mole % on the basis of a sum of a molar number of the metal and a molar number of Ni contained in the lithiated nickel dioxide; kneading the lithiated nickel dioxide or the composite lithiated nickel dioxide together with a conductive substance, a binder and a solvent in an atmosphere including carbon dioxide which content is higher than air to produce a paste; coating the paste over a current collector; and drying the current collector bearing the paste.

10. A method for providing increased density in a sheet-type cathode, comprising the steps of:
    (a) firing a mixture of a lithium compound and a nickel compound at a temperature ranging between 350° C. and 800° C. to give lithiated nickel dioxide, and
    (b) treating the lithiated nickel dioxide in an atmosphere including carbon dioxide which content is higher than air.

11. A method according to claim 10, wherein the lithium compound and the nickel compound are mixed in a proportion that attains an excessive content of lithium.

* * * * *